F. W. JATUNN.
FLYING MACHINE.
APPLICATION FILED FEB. 21, 1910.

992,874.

Patented May 23, 1911.

2 SHEETS—SHEET 1.

Witnesses:—
Louis W. Gratz.
Q. P. Knight.

Inventor
Frank W. Jatunn.
by Townsend Haustaeble
Atty.

F. W. JATUNN.
FLYING MACHINE.
APPLICATION FILED FEB. 21, 1910.
992,874.
Patented May 23, 1911.
2 SHEETS—SHEET 2.
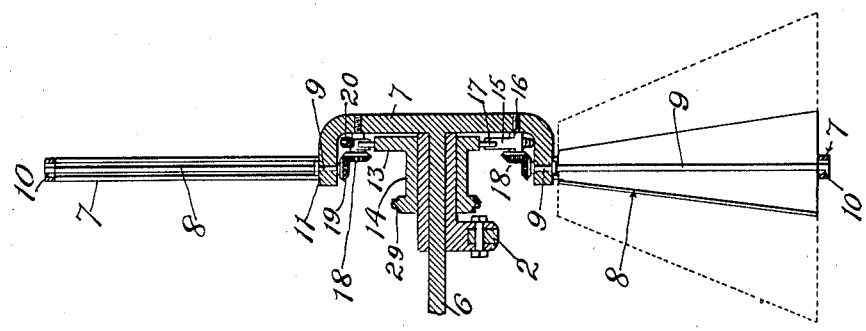
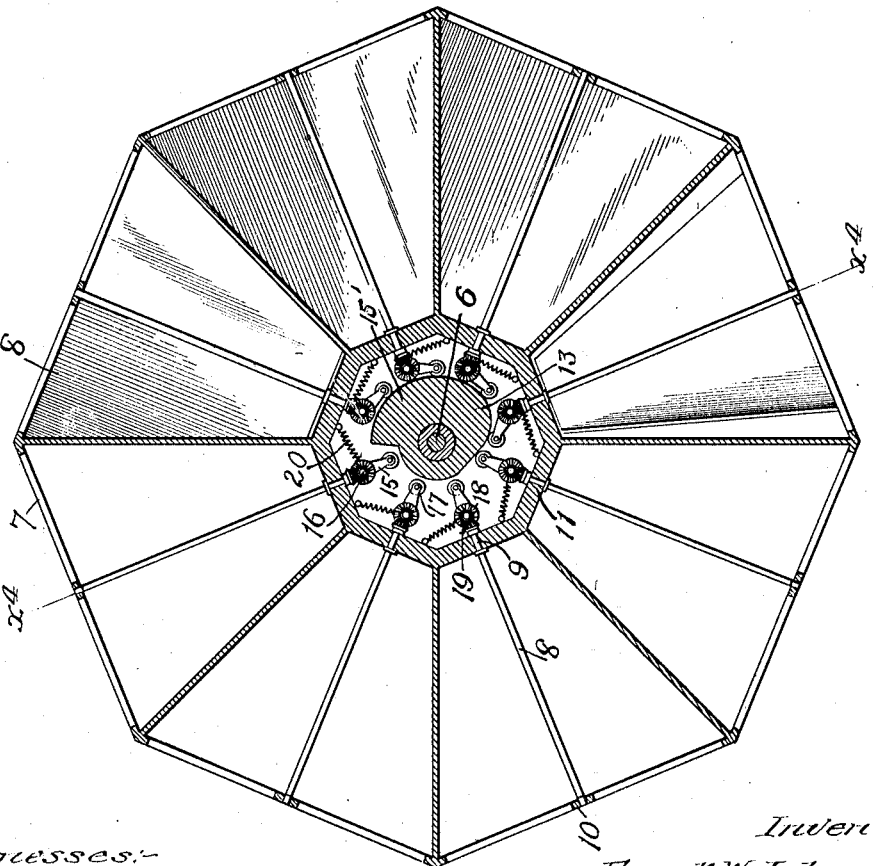
Witnesses:
Inventor
Frank W. Jatunn

UNITED STATES PATENT OFFICE.

FRANK W. JATUNN, OF LOS ANGELES, CALIFORNIA.

FLYING-MACHINE.

992,874.  Specification of Letters Patent.  Patented May 23, 1911.

Application filed February 21, 1910. Serial No. 545,215.

*To all whom it may concern:*

Be it known that I, FRANK W. JATUNN, a citizen of the United States, residing in Los Angeles, in the county of Los Angeles and State of California, have invented a new and useful Flying-Machine, of which the following is a specification.

The main object of the present invention is to provide means for operating a flying machine by the direct action of rotary wing members in both the forward and upward movement of the machine.

Another object of the invention is to provide means for convenient control of the operating wing members whereby the forward and upward tendency of the machine may be varied at will.

Other objects of the invention will appear hereinafter.

Figure 1:
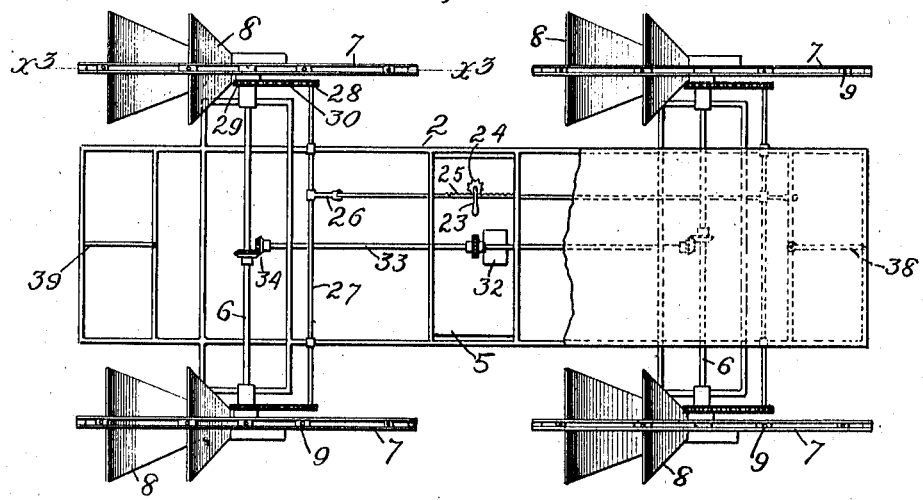
Figure 2:
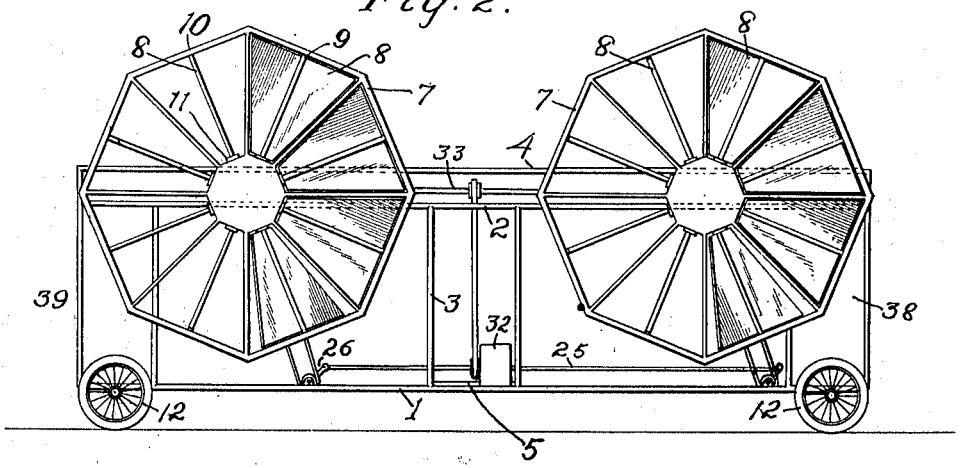

The accompanying drawings illustrate the invention, and referring thereto:

Figure 1 is a plan of the machine with a portion of the aeroplane surface broken away to show the underlying parts. Fig. 2 is a side elevation of the machine. Fig. 3 is a vertical section on line $x^3$—$x^3$, Fig. 1. Fig. 4, is a vertical section on line $x^4$—$x^4$, Fig. 3.

The frame of the machine may be of any suitable character, being for example, composed of a lower frame member 1, an upper frame member 2, and vertically extending struts 3 connecting said lower and upper members. An aeroplane 4 may be provided extending over the top of the upper member 2. Centrally of the frame there may be provided a platform 5 for the operator. Frame 2 has ground wheels 12.

Rotary wing members are provided for the operation of the machine, said members being arranged in pairs on shafts 6 extending transversely of the frame and journaled, for example, in bearings on the upper frame member 2. At each end of each shaft 6 there is provided one of the rotary wing members consisting of a frame or spider 7 attached to said shaft and a plurality of wings or vanes 8 carried by radially extending shafts 9 mounted to turn in bearings 10, 11 in the spider 7. Means are provided whereby these vanes are moved into and out of position transverse to the plane of rotation of the wing member. Said means consists of a cam 13 carried by a sleeve 14 rotatably adjustable on the shaft 6, and arms 15 pivoted on shafts 16 journaled on the spider 7 and provided with antifriction rolls 17 for engaging the surface of the cam, each shaft 16 carrying a bevel pinion 18 engaging with a bevel pinion 19 on the shaft 9 of the wing 8. The cam 13 has a portion 13' of relatively large diameter, and when the rolls 17 of arms 15 are traveling on this portion, the wings 8 will be held in the plane of the spider 7 so as to be presented edgewise in the direction of rotation and to be without effect on the air.

A spring means 20 is provided for each arm 15 tending to hold the roll of said arm against the cam 13 and to turn the wing 8 when said roll passes onto the portion of the cam of smaller diameter. The moment that the wing is turned in this manner, it will catch the air and the pressure of the air thereupon will complete the opening movement and cause the wing to move to position where it sets at right angles to the plane of rotation of the spider. By adjustment of the cam 13, the place in the rotation of the spider at which this opening of the wings is effected, can be controlled, and means for such adjustment is provided, consisting of a hand lever 23 mounted in convenient position for manipulation by the operator and connected through gear 24, rack 25 and arm 26 with a shaft 27 which is connected by a sprocket wheel 28, 29 and sprocket chain 30 with the sleeve 14 carrying the cam 13, so that on operation of the lever 23 all of the cams are adjusted in unison.

Any suitable motive power, for example, a motor or motors indicated at 32, may be connected to drive the rotary wing members, for example, the longitudinal motor driven shaft 33 may be connected by bevel gears 34 to the shafts 6 aforesaid.

The operation is as follows:—The motor or motors 32 are set in operation and the shafts 6 are thereby rotated. In such rotation the arms 15 are carried around so that their rolls 17 engage with the cam 13 in such manner that as each arm comes onto the lower or smaller portion of the cam, the spring 20 operates to turn the arm inwardly and through the bevel gears 19 and 18 to turn the wing or vane 8, so that it will extend transversely of the spider 7 and will tend to catch the wind. The pressure of the wind on the wing or vane will then tend to complete the opening out of the wing or vane, so that during this portion of the revolution of the wing it will act on the air and will cause a reaction on the machine. In starting, the cams 13 are adjusted to such angular position that the wings are brought into effective or transverse position as stated during their motion from upper to lower position on the rotary members, thereby causing the wings to force the air downwardly and the reaction on the machine will, therefore, be upward, causing the machine to rise. During the remainder of the revolution of the wings the arms 15 will be engaged by their rolls 17 with the larger portion 13' of the cam 13, thereby returning the wings 8 to flat or edgewise position relatively to the spider 7, so that during this portion, namely the ascending portion, of the revolution they are without action on the air. The operator, through the connections 24, 23, etc., can vary the position of the cam member 13 so as to angularly shift the effective portion of the revolution of the wings, so that said wings have a resultant action in a rearward, as well as an upward direction, thereby causing a forward reaction on the frame, so that a forward velocity, as well as an upward tendency, may be imparted to the machine. Or in case it is desired to retard the machine, the reverse effect may be obtained by shifting the cam 13 in reverse direction.

In alighting, the machine will run on the running gear or wheels 19, and, if desired, such running gear may be utilized in starting in case it is desired to start with a forward as well as an upward movement. The aeroplane member 4 serves to steady the machine in its forward movement and also to provide a safeguard in case it is desired to descend without reliance on the rotary wing members.

The machine may be steered by means of a rudder 38, provided with any suitable means of control, and a fixed vertical plane 39 may be provided at the front of the machine to aid in keeping the machine in a straight course. It will be understood that there will be four or more of the rotary wing-members.

What I claim is:—

1. A flying machine comprising a frame, a plurality of pairs of rotary members journaled thereon, means for driving said rotary members, each rotary member comprising a spider, a plurality of radial shafts journaled on said spider, wings carried by said radial shafts, means for controlling the angular position of said wings relatively to the plane of the spider, said means consisting of a cam rotatably mounted concentric with the axis of rotation of the said rotary member, arms engaging said cam, and gear connections between said arms and the respective radial shafts.

2. A flying machine comprising a frame, a plurality of pairs of rotary members journaled thereon, means for driving said rotary members, each rotary member comprising a spider, a plurality of radial shafts journaled on said spider, wings carried by said radial shafts, means for controlling the angular position of said wings relatively to the plane of the spider, said means consisting of a cam rotatably mounted concentric with the axis of rotation of the said rotary member, arms engaging said cam, gear connections between said arms and the respective radial shafts, and spring means holding said arms into engagement with said cam.

In testimony whereof, I have hereunto set my hand at Los Angeles, California, this 14th day of February, 1910.

FRANK W. JATUNN.

In presence of—
ARTHUR P. KNIGHT,
FRANK L. A. GRAHAM.